United States Patent
Motomura et al.

(10) Patent No.: US 9,746,193 B2
(45) Date of Patent: Aug. 29, 2017

(54) AIR-CONDITIONING APPARATUS AND METHOD OF DESIGNING SAME

(71) Applicants: Yuji Motomura, Tokyo (JP); Daisuke Shimamoto, Tokyo (JP); Takayoshi Honda, Tokyo (JP); Osamu Morimoto, Tokyo (JP); Koji Nishioka, Tokyo (JP); Tatsuo Ono, Tokyo (JP)

(72) Inventors: Yuji Motomura, Tokyo (JP); Daisuke Shimamoto, Tokyo (JP); Takayoshi Honda, Tokyo (JP); Osamu Morimoto, Tokyo (JP); Koji Nishioka, Tokyo (JP); Tatsuo Ono, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 215 days.

(21) Appl. No.: 14/441,534

(22) PCT Filed: Nov. 30, 2012

(86) PCT No.: PCT/JP2012/081070
§ 371 (c)(1),
(2) Date: May 8, 2015

(87) PCT Pub. No.: WO2014/083679
PCT Pub. Date: Jun. 5, 2014

(65) Prior Publication Data
US 2015/0292758 A1 Oct. 15, 2015

(51) Int. Cl.
F25B 13/00 (2006.01)
F24F 5/00 (2006.01)
(Continued)

(52) U.S. Cl.
CPC .............. *F24F 5/001* (2013.01); *B23P 15/26* (2013.01); *F25B 13/00* (2013.01); *F25B 25/005* (2013.01);
(Continued)

(58) Field of Classification Search
CPC . F24F 5/001; F24F 3/065; B23P 15/26; F25B 25/005; F25B 13/00;
(Continued)

(56) References Cited

U.S. PATENT DOCUMENTS

2003/0056525 A1* 3/2003 Taira ................... C09K 5/045
62/114
2006/0179868 A1 8/2006 Yoon et al.
(Continued)

FOREIGN PATENT DOCUMENTS

CN 102483272 A 5/2012
JP 2005-351600 A 12/2005
(Continued)

OTHER PUBLICATIONS

Office Action mailed Nov. 10, 2015 issued in corresponding JP patent application No. 2014-549726 (and English translation).
(Continued)

*Primary Examiner* — Len Tran
*Assistant Examiner* — Ana Vazquez
(74) *Attorney, Agent, or Firm* — Posz Law Group, PLC

(57) ABSTRACT

An air-conditioning apparatus includes a refrigerant circuit in which a compressor, a heat-source-side heat exchanger, an expansion device, and a refrigerant flow path in at least one intermediate heat exchanger are connected by a refrigerant pipe, and a heat medium circuit in which a pump, a use-side heat exchanger, and a heat-medium flow path in the at least one intermediate heat exchanger are connected by a heat-medium conveying pipe, the heat medium circuit being (Continued)

configured to cause a heat medium to circulate therethrough. The at least one intermediate heat exchanger comprises a plurality of intermediate heat exchangers. The plurality of intermediate heat exchangers are operative in a heating only operation mode, a cooling only operation mode, and a cooling and heating mixed operation mode in which some of the intermediate heat exchangers serve as the condenser and others of the intermediate heat exchangers serve as the evaporator.

5 Claims, 6 Drawing Sheets

(51) Int. Cl.
*F25B 25/00* (2006.01)
*B23P 15/26* (2006.01)
*F24F 3/06* (2006.01)

(52) U.S. Cl.
CPC ......... *F24F 3/065* (2013.01); *F25B 2313/003* (2013.01); *F25B 2313/006* (2013.01); *F25B 2313/0231* (2013.01); *F25B 2313/0232* (2013.01); *F25B 2313/0233* (2013.01); *F25B 2313/0272* (2013.01); *F25B 2313/02732* (2013.01); *F25B 2313/02741* (2013.01); *F25B 2500/01* (2013.01)

(58) Field of Classification Search
CPC ........ F25B 2313/0231; F25B 2313/006; F25B 2313/007; F25B 2313/003; F25B 2500/01; F25B 2313/0232; F25B 2313/0233; F25B 2313/02732; F25B 2313/02741

See application file for complete search history.

(56) References Cited

U.S. PATENT DOCUMENTS

| | | | |
|---|---|---|---|
| 2011/0088421 A1* | 4/2011 | Wakamoto | ............ F25B 13/00 62/238.7 |
| 2012/0006436 A1 | 1/2012 | Morimoto et al. | |
| 2012/0118005 A1 | 5/2012 | Yamashita et al. | |

FOREIGN PATENT DOCUMENTS

| | | | |
|---|---|---|---|
| JP | 2006-110494 A | 4/2006 |
| JP | 2010-091178 A | 4/2010 |
| WO | 2008/013105 A1 | 1/2008 |
| WO | 2010/049998 A1 | 5/2010 |
| WO | 2010/119560 A1 | 10/2010 |
| WO | 2010/131378 A1 | 11/2010 |
| WO | 2011/030430 A1 | 3/2011 |

OTHER PUBLICATIONS

Extended European Search Report mailed on Jul. 14, 2016 in the corresponding EP application No. 12889109.0.
International Search Report of the International Searching Authority mailed Feb. 19, 2013 for the corresponding international application No. PCT/JP2012/081070 (and English translation).
Chinese Office Action of Oct. 19, 2016 in the corresponding CN application No. 201280077230.7 (English translation).
Office Action dated Jun. 6, 2017 in corresponding CN application No. 201280077230.7 (and English translation).

\* cited by examiner

AIR-CONDITIONING APPARATUS AND METHOD OF DESIGNING SAME

CROSS REFERENCE TO RELATED APPLICATION

This application is a U.S. national stage application of PCT/JP2012/081070 filed on Nov. 30, 2012, the contents of which are incorporated herein by reference.

TECHNICAL FIELD

The present invention relates to an air-conditioning apparatus and method of designing the same.

BACKGROUND ART

A known air-conditioning apparatus used in, for example, a multi-air-conditioning apparatus for a building causes a refrigerant to circulate between an outdoor unit being a heat source device arranged, for example, outside a structure and an indoor unit arranged inside a room in the structure. Air-conditioned space where the indoor unit is arranged is cooled or heated by air heated or cooled by the refrigerant rejecting or removing the heat. One example refrigerant frequently used in such an air-conditioning apparatus may be a hydrofluorocarbon (HFC) refrigerant. There is also an example that uses a natural refrigerant, such as carbon dioxide ($CO_2$).

One existing air-conditioning apparatus used in, for example, a multi-air-conditioning apparatus for a building is the one in which a refrigerant is circulated between an outdoor unit and a relay unit, a heat medium is circulated between the relay unit and an indoor unit, and air-conditioned space where the indoor unit is arranged is cooled or heated by heat exchange between the refrigerant and the heat medium in a heat exchanger in the relay unit (see, for example, Patent Literature 1).

CITATION LIST

Patent Literature

Patent Literature 1: International Publication No. WO 2010/49998 (paras. [0010] to [0096], FIGS. 1 to 10)

SUMMARY OF INVENTION

Technical Problem

In such an air-conditioning apparatus, the heat medium heated in the heat exchanger in the relay unit is conveyed by heat-medium conveying means to an indoor unit that performs heating operation from among the connected indoor units. The heat medium cooled in the heat exchanger in the relay unit is conveyed by the heat-medium conveying means to an indoor unit that performs cooling operation from among the connected indoor units.

If the flow speed of the heat medium in a pipe through which the heat medium is conveyed is too high, an oxide film in the inner surface of the pipe may be separated, this may cause pitting corrosion, and as a result, an issue arises in that the heat medium leaks from that pipe. If the flow speed of the heat medium is too low, corrosion products may accumulate on the inner surface of the pipe, this may cause pitting corrosion, and as a result, an issue arises in that the heat medium leaks from that pipe.

The present invention is made to solve the above-described problems. It is an object of the present invention to provide an air-conditioning apparatus with a reduced risk of leakage of a heat medium from a pipe and with ensured safety. It is also an object of the present invention to provide a method of designing an air-conditioning apparatus with a reduced risk of leakage of a heat medium from a pipe and with ensured safety.

Solution to Problem

An air-conditioning apparatus according to the present invention includes a refrigerant circuit in which a compressor, a heat-source-side heat exchanger, an expansion device, and a refrigerant flow path in at least one intermediate heat exchanger configured to cause heat exchange between a refrigerant and a heat medium are connected by a refrigerant pipe, the refrigerant circuit being configured to cause the refrigerant to circulate therethrough, and a heat medium circuit in which a pump, a use-side heat exchanger, and a heat-medium flow path in the at least one intermediate heat exchanger are connected by a heat-medium conveying pipe, the heat medium circuit being configured to cause the heat medium to circulate therethrough. The at least one intermediate heat exchanger comprises a plurality of intermediate heat exchangers. The plurality of intermediate heat exchangers are operative in a heating only operation mode in which all of the intermediate heat exchangers serve as a condenser, a cooling only operation mode in which all of the intermediate heat exchangers serve as an evaporator, and a cooling and heating mixed operation mode in which some of the intermediate heat exchangers serve as the condenser and others of the intermediate heat exchangers serve as the evaporator. The heat-medium conveying pipe has an inside diameter set on the basis of a capacity of the use-side heat exchanger connected to the heat-medium conveying pipe.

Advantageous Effects of Invention

The inside diameter of the heat-medium conveying pipe in the air-conditioning apparatus according to the present invention is set on the basis of the capacity of the use-side heat exchanger connected to that heat-medium conveying pipe. Thus, the heat medium flows in the heat-medium conveying pipe at an appropriate flow speed. Therefore, the occurrence of corrosion in the heat-medium conveying pipe can be reduced, leakage of the heat medium from the heat-medium conveying pipe can be suppressed, and safety can be ensured.

DESCRIPTION OF EMBODIMENTS

Embodiment of the present invention is described below on the basis of the drawings.

Figure 1:
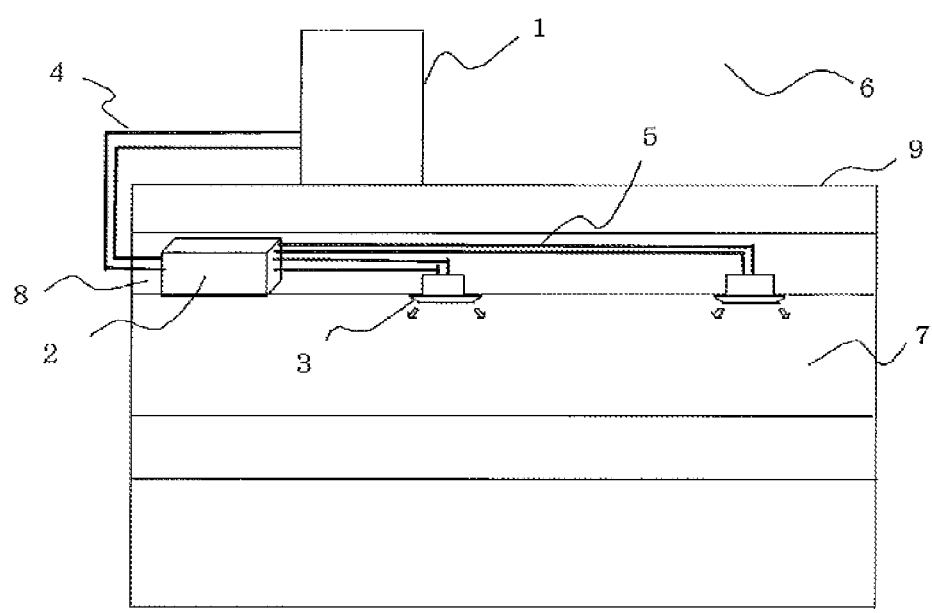
FIG. 1 is a schematic diagram that illustrates an example of placement of an air-conditioning apparatus according to Embodiment of the present invention.

FIG. 1 is a schematic diagram that illustrates an example of placement of an air-conditioning apparatus according to Embodiment of the present invention. The example of placement of the air-conditioning apparatus is described on the basis of FIG. 1. The air-conditioning apparatus allows each indoor unit to freely select cooling mode or heating mode as operation mode by using refrigeration cycles (refrigerant circuit A and heat medium circuit B) for circulating refrigerants (heat-source-side refrigerant and heat medium). FIG. 1 schematically illustrates in general the air-conditioning apparatus in which a plurality of indoor units 3 are connected. The relationships among the sizes of components in the drawings described below, which includes FIG. 1, may differ from the real ones.

In FIG. 1, the air-conditioning apparatus according to Embodiment includes an outdoor unit (heat source device) 1, the plurality of indoor units 3, and a single relay unit 2 disposed between the outdoor unit 1 and the indoor units 3. The relay unit 2 is configured to cause the heat-source-side refrigerant and the heat medium to exchange heat with each other. The outdoor unit 1 and the relay unit 2 are connected by refrigerant pipes 4 allowing the heat-source-side refrigerant to travel therethrough. The relay unit 2 and the indoor units 3 are connected by pipes (heat medium pipes) 5 allowing the heat medium to travel therethrough. Cooling energy or heating energy generated by the outdoor unit 1 is delivered to the indoor units 3 through the relay unit 2.

The outdoor unit 1 is typically arranged in outdoor space 6, which is space outside a structure 9 of, for example, a building (e.g., on the roof) and is configured to supply cooling energy or heating energy to the indoor units 3 through the relay unit 2. Each of the indoor units 3 is arranged in a location at which it can supply air for cooling or air for heating to indoor space 7, which is space inside the structure 9 (e.g., a living room), and is configured to supply the air for cooling or the air for heating to the indoor space 7, which is an air-conditioned space. The relay unit 2 is configured as a housing different from the outdoor unit 1 and the indoor unit 3, can be disposed in a location different from the outdoor space 6 and the indoor space 7, is connected to the outdoor unit 1 and the indoor unit 3 by the refrigerant pipes 4 and the pipes 5 (heat-medium conveying pipes 5), respectively, and is configured to transmit the cooling energy or heating energy supplied from the outdoor unit 1, to the indoor unit 3.

Actions of the air-conditioning apparatus according to Embodiment of the present invention are briefly described.

The heat-source-side refrigerant is conveyed from the outdoor unit 1 to the relay unit 2 through the refrigerant pipe 4. The conveyed heat-source-side refrigerant exchanges heat with the heat medium in an intermediate heat exchanger (described below) inside the relay unit 2 and heats or cools the heat medium. That is, warm water or cold water is generated in the intermediate heat exchanger. The warm water or cold water generated in the relay unit 2 is conveyed to the indoor unit 3 through the pipe 5 by a heat-medium conveying device (described below) and it is provided, in the indoor unit 3, to heating operation or cooling operation for the indoor space 7.

Examples of the heat-source-side refrigerant may include a single component refrigerant, such as R-22, R-134a, or R-32, a near-azeotropic refrigerant mixture, such as R-410A or R-404A, a zeotropic refrigerant mixture, such as R-407C, a refrigerant that includes a double bond in its chemical formula and that has a relatively small global warming potential value, such as $CF_3CF=CH_2$, a mixture thereof, and a natural refrigerant, such as $CO_2$ or propane.

Examples of the heat medium may include water, antifreeze, a liquid mixture of water and antifreeze, and a liquid mixture of water and an additive having high anti-corrosive properties.

As illustrated in FIG. 1, in the air-conditioning apparatus according to Embodiment, the outdoor unit 1 and the relay unit 2 are connected by the two refrigerant pipes 4, and the relay unit 2 and each of the indoor units 3 are connected by the two pipes 5. In the air-conditioning apparatus according to Embodiment, the units (outdoor unit 1, indoor units 3, and relay unit 2) are connected using two pipes (refrigerant pipes 4 and pipes 5), and thus the execution of construction work is easy.

FIG. 1 illustrates, as an example, the state in which the relay unit 2 is disposed in space that is inside the structure 9 but different from the indoor space 7, such as space above a ceiling, (hereinafter referred to simply as space 8). The relay unit 2 may also be disposed in, for example, a common space where, for example, an elevator is present. FIG. 1 illustrates the case in which the indoor unit 3 is of the ceiling cassette type, as an example. Other cases are also applicable. The indoor unit 3 may be of any type that can blow air for heating or air for cooling into the indoor space 7 directly or using a duct or the like, such as the ceiling concealed type or ceiling suspended type.

FIG. 1 illustrates the case where the outdoor unit 1 is disposed in the outdoor space 6, as an example. Other cases are also applicable. For example, the outdoor unit 1 may be disposed in an enclosed space with a vent, such as a machine room, may also be disposed inside the structure 9 if waste heat can be ejected to the outside of the structure 9 through an exhaust duct, or may also be disposed inside the structure 9 when the outdoor unit 1 is a water-cooled one. Even when the outdoor unit 1 is disposed in such locations, no particular problem occurs.

The relay unit 2 may also be disposed in the vicinity of the outdoor unit 1. It is noted, however, that if the distance between the relay unit 2 and the indoor unit 3 is too long, the power of conveying the heat medium is significantly increased and thus the advantage of energy savings is reduced. In addition, the numbers of connected outdoor units 1, indoor units 3, and relay units 2 are not limited to those illustrated in FIG. 1 and can be selected in accordance with the structure 9 where the air-conditioning apparatus according to Embodiment is disposed.

When a plurality of relay units 2 are connected to a single outdoor unit 1, the plurality of relay units 2 may be interspersed in a common space in a structure of, for example, a building or another space, such as space above a ceiling. This enables the intermediate heat exchangers in the relay units 2 to produce the air-conditioning load. The indoor units 3 may be disposed at a distance or height within a conveying allowance range of the intermediate heat exchangers in the relay units 2 and can be arranged throughout a structure of, for example, a building.

Figure 2:
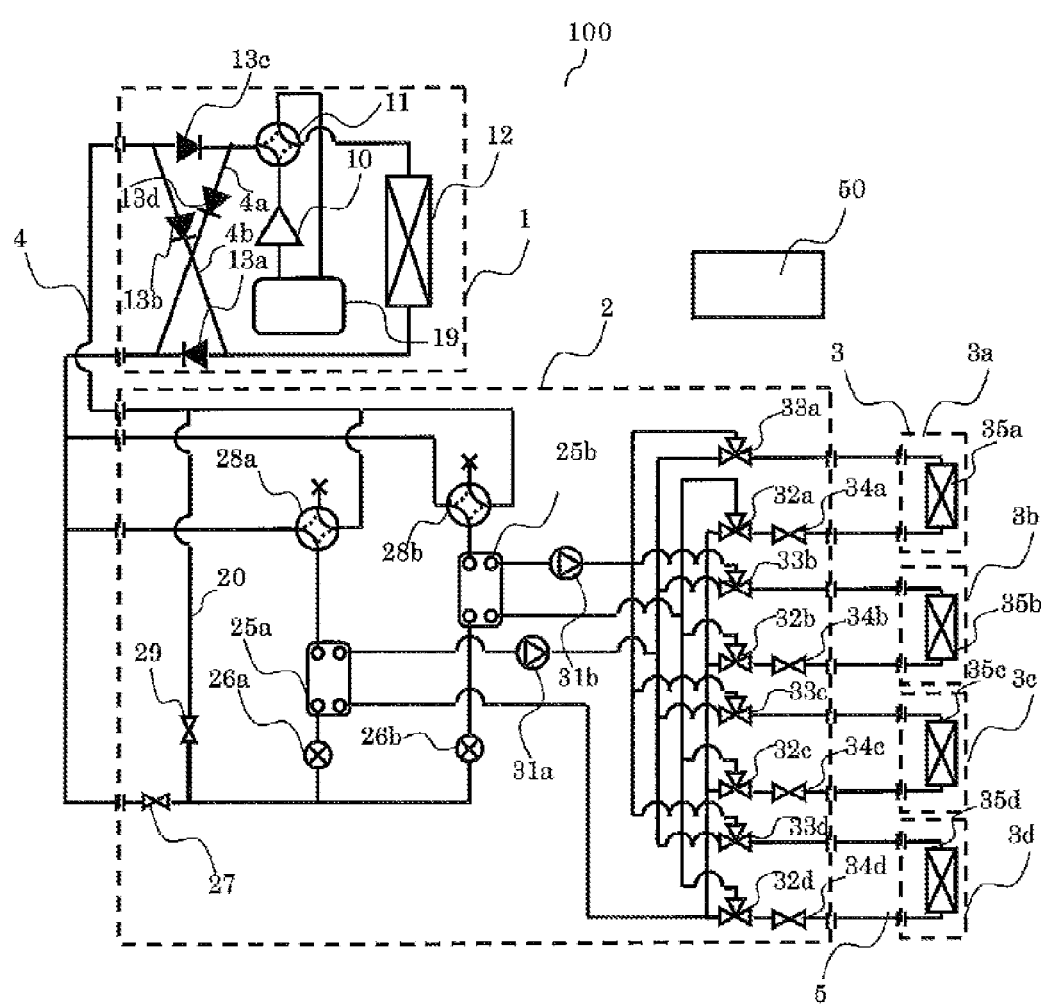
FIG. 2 is a schematic circuit configuration diagram that illustrates an example of a circuit configuration in the air-conditioning apparatus according to Embodiment of the present invention.

FIG. 2 is a schematic circuit configuration diagram that illustrates an example of a circuit configuration of the air-conditioning apparatus according to Embodiment (hereinafter referred to as air-conditioning apparatus 100). The configuration of the air-conditioning apparatus 100, that is, the workings of each actuator included in the refrigerant circuits are described in detail on the basis of FIG. 2. As illustrated in FIG. 2, the outdoor unit 1 and the relay unit 2 are connected by the refrigerant pipes 4 through an intermediate heat exchanger (refrigerant-water heat exchanger) 25a and an intermediate heat exchanger (refrigerant-water heat exchanger) 25b included in the relay unit 2. The relay unit 2 and the indoor units 3 are connected by the pipes 5 through the intermediate heat exchangers 25a and 25b. The refrigerant pipes 4 and the pipes 5 are described in a later part.

[Outdoor Unit 1]

The outdoor unit 1 incorporates a compressor 10, a first refrigerant flow switching device 11, such as a four-way valve, a heat-source-side heat exchanger 12, and an accumulator 19, and these components are connected in series by the refrigerant pipes 4. The outdoor unit 1 includes a refrigerant connection pipe 4a, a refrigerant connection pipe 4b, a check valve 13a, a check valve 13b, a check valve 13c, and a check valve 13d. The inclusion of the refrigerant connection pipes 4a and 4b and check valves 13a to 13d enables the stream of the heat-source-side refrigerant toward the relay unit 2 to flow in a certain direction for any operation requested by the indoor unit 3.

The compressor 10 is configured to suck the heat-source-side refrigerant, compress it to a high-temperature and high-pressure state, and convey it to the refrigerant circuit A. One example of the compressor 10 may be an inverter compressor whose capacity is controllable. The first refrigerant flow switching device 11 is configured to switch the stream of the heat-source-side refrigerant in heating operation (heating only operation mode and heating main operation mode) and the stream of the heat-source-side refrigerant in cooling operation (cooling only operation mode and cooling main operation mode).

The heat-source-side heat exchanger 12 functions as an evaporator in heating operation and functions as a condenser (or radiator) in cooling operation and is configured to cause fluid of air supplied from an air-sending device, such as a fan, which is not illustrated, and the heat-source-side refrigerant to exchange heat with each other and to evaporate and gasify or condense and liquefy the heat-source-side refrigerant. The accumulator 19 is disposed on the suction side of the compressor 10 and is configured to accumulate a redundant refrigerant produced by the difference between that in heating operation and that in cooling operation or a redundant refrigerant corresponding to a change in transitional operation.

The check valve 13c is disposed on the refrigerant pipe 4 between the relay unit 2 and the first refrigerant flow switching device 11 and is configured to permit the stream of the heat-source-side refrigerant in only a predetermined direction (direction from the relay unit 2 toward the outdoor unit 1). The check valve 13a is disposed on the refrigerant pipe 4 between the heat-source-side heat exchanger 12 and the relay unit 2 and is configured to permit the stream of the heat-source-side refrigerant in only a predetermined direction (direction from the outdoor unit 1 toward the relay unit 2). The check valve 13d is disposed on the refrigerant connection pipe 4a and is configured to direct the heat-source-side refrigerant discharged from the compressor 10 to the relay unit 2 in heating operation. The check valve 13b is disposed on the refrigerant connection pipe 4b and is configured to direct the heat-source-side refrigerant returning from the relay unit 2 to the suction side of the compressor 10 in heating operation.

The refrigerant connection pipe 4a connects the refrigerant pipe 4 between the first refrigerant flow switching device 11 and the check valve 13c and the refrigerant pipe 4 between the check valve 13a and the relay unit 2 inside the outdoor unit 1. The refrigerant connection pipe 4b connects the refrigerant pipe 4 between the check valve 13c and the relay unit 2 and the refrigerant pipe 4 between the heat-source-side heat exchanger 12 and the check valve 13a inside the outdoor unit 1. FIG. 2 illustrates the case where the refrigerant connection pipes 4a and 4b and the check valves 13a to 13d are included as an example. Other cases are also applicable. The refrigerant connection pipes 4a and 4b and the check valves 13a to 13d are optional.

[Indoor Unit 3]

Each of the indoor units 3 incorporates a use-side heat exchanger 35. The use-side heat exchanger 35 is connected to a heat medium flow control device 34 and a second heat medium flow switching device 33 in the relay unit 2 by the pipes 5. The use-side heat exchanger 35 is configured to cause air supplied from an air-sending device, such as a fan, which is not illustrated, and the heat medium to exchange heat with each other and to generate heating air or cooling air to be supplied to the indoor space 7.

FIG. 2 illustrates the case where the four indoor units 3 are connected to the relay unit 2, as an example. The four indoor units 3 are illustrated as indoor units 3a, 3b, 3c, and 3d from above in the drawing. The use-side heat exchangers 35 are illustrated as use-side heat exchangers 35a, 35b, 35c, and 35d from above in the drawing in accordance with the indoor units 3a, 3b, 3c, and 3d. As in the case illustrated in FIG. 1, the number of connected indoor units 3 is not limited to four, which is in illustrated in FIG. 2.

[Relay Unit 2]

The relay unit 2 incorporates two or more intermediate heat exchangers 25, two expansion devices 26, two opening and closing devices (opening and closing device 27 and opening and closing device 29), two second refrigerant flow switching devices 28, two pumps 31 being heat-medium conveying devices (hereinafter referred to as pumps), four first heat medium flow switching devices 32, the four second heat medium flow switching devices 33, and the four heat medium flow control devices 34.

Each of the two intermediate heat exchangers 25 (intermediate heat exchangers 25a and 25b) functions as a condenser (radiator) in supplying heating energy to the indoor unit 3 performing heating operation, functions as an evaporator in supplying cooling energy to the indoor unit 3 performing cooling operation, and is configured to cause the heat-source-side refrigerant and the heat medium to exchange heat with each other and to transmit the cooling energy or heating energy generated in the outdoor unit 1 and stored in the heat-source-side refrigerant to the heat medium. The intermediate heat exchanger 25a is disposed between the expansion device 26a and the second refrigerant flow switching device 28a in the refrigerant circuit A and is configured to work for cooling the heat medium in cooling and heating mixed operation mode. The intermediate heat exchanger 25b is disposed between the expansion device 26b and the second refrigerant flow switching device 28b in the refrigerant circuit A and is configured to work for heating the heat medium in cooling and heating mixed operation mode.

The two expansion devices 26 (expansion devices 26a and 26b) have the functions as a pressure reducing valve and an expansion valve and are configured to reduce the pressure of the heat-source-side refrigerant and expand it. The expansion device 26a is disposed on the upstream side of the intermediate heat exchanger 25a in the stream of the heat-source-side refrigerant in cooling operation. The expansion device 26b is disposed on the upstream side of the intermediate heat exchanger 25b in the stream of the heat-source-side refrigerant in cooling operation. One example of each of the two expansion devices 26 may be a device whose opening degree is variably controllable, such as an electronic expansion valve.

One example of each of the two opening and closing devices (opening and closing devices 27 and 29) may be a solenoid valve that can be opened and closed by energization. The two opening and closing devices are configured to open and close the refrigerant pipe 4. That is, the opening and closing of the two opening and closing devices is controlled in accordance with the operation mode, and they switch the flow of the heat-source-side refrigerant. The opening and closing device 27 is disposed on the refrigerant pipe 4 on the inlet side of the heat-source-side refrigerant (lowest refrigerant pipe 4 from among the refrigerant pipes 4 connecting the outdoor unit 1 and the relay unit 2 in the drawing). The opening and closing device 29 is disposed on the pipe (bypass pipe 20) connecting the refrigerant pipe 4 on the inlet side of the heat-source-side refrigerant and the refrigerant pipe 4 on the outlet side thereof. The opening and closing devices 27 and 29 are any device that can switch the refrigerant flow. One such example may be a device whose opening degree is variably controllable, such as an electronic expansion valve.

One example of each of the two second refrigerant flow switching devices 28 (second refrigerant flow switching devices 28a and 28b) may be a four-way valve. The second refrigerant flow switching devices 28 are configured to switch the stream of the heat-source-side refrigerant such that the intermediate heat exchangers 25 serve as a condenser or evaporator in accordance with the operation mode. The second refrigerant flow switching device 28a is disposed on the downstream side of the intermediate heat exchanger 25a in the stream of the heat-source-side refrigerant in cooling operation. The second refrigerant flow switching device 28b is disposed on the downstream side of the intermediate heat exchanger 25b in the stream of the heat-source-side refrigerant in cooling only operation mode.

The two pumps 31 (pumps 31a and 31b) are configured to cause the heat medium traveling through the pipes 5 to circulate through the heat medium circuit B. The pump 31a is disposed on the pipe 5 between the intermediate heat exchanger 25a and the second heat medium flow switching device 33. The pump 31b is disposed on the pipe 5 between the intermediate heat exchanger 25b and the second heat medium flow switching device 33. One example of each of the two pumps 31 may be a pump whose capacity is controllable, and it may be preferred that the flow rate in the pump 31 is adjustable in accordance with the magnitude of the load in the indoor unit 3.

One example of each of the four first heat medium flow switching devices 32 (first heat medium flow switching devices 32a to 32d) may be a three-way valve. The first heat medium flow switching devices 32 are configured to switch the heat-medium flow between the intermediate heat exchangers 25a and 25b. The number of first heat medium flow switching devices 32 corresponds to the number of indoor units 3 disposed (here, four). Each of the first heat medium flow switching devices 32 has three ports: a first one is connected to the intermediate heat exchanger 25a, a second one is connected to the intermediate heat exchanger 25b, and a third one is connected to the heat medium flow control device 34. The first heat medium flow switching device 32 is disposed on the outlet side of the heat-medium flow in the use-side heat exchanger 35. The first heat medium flow switching devices 32 are illustrated as first heat medium flow switching devices 32a to 32d from above in the drawing in accordance with the indoor units 3. The switching of the heat-medium flow includes not only full switching from one to another but also partial switching from one to another.

One example of each of the four second heat medium flow switching devices 33 (second heat medium flow switching devices 33a to 33d) may be a three-way valve. The second heat medium flow switching devices 33 are configured to switch the heat-medium flow between the intermediate heat exchangers 25a and 25b. The number of second heat medium flow switching devices 33 corresponds to the number of indoor units 3 disposed (here, four). Each of the second heat medium flow switching devices 33 has three ports: a first one is connected to the intermediate heat exchanger 25a, a second one is connected to the intermediate heat exchanger 25b, and a third one is connected to the use-side heat exchanger 35. The second heat medium flow switching device 33 is disposed on the inlet side of the heat-medium flow in the use-side heat exchanger 35. The second heat medium flow switching devices 33 are illustrated as second heat medium flow switching devices 33a to 33d from above in the drawing in accordance with the indoor units 3. The switching of the heat-medium flow includes not only full switching from one to another but also partial switching from one to another.

One example of each of the four heat medium flow control devices 34 (heat medium flow control devices 34a to 34d) may be a two-way valve whose opening port area is controllable. The heat medium flow control devices 34 are configured to switch the flow rate of the heat medium flowing in the pipes 5. The number of heat medium flow control devices 34 corresponds to the number of indoor units 3 disposed (here, four). Each of the heat medium flow control devices 34 has two ports: one is connected to the use-side heat exchanger 35 and another is connected to the first heat medium flow switching device 32. The heat medium flow control device 34 is disposed on the outlet side of the heat-medium flow in the use-side heat exchanger 35. That is, the heat medium flow control device 34 is configured to adjust the amount of the heat medium flowing into the indoor unit 3 in accordance with the temperature of the heat medium flowing into the indoor unit 3 and the temperature of the heat medium exiting therefrom and to enable an optimal amount of the heat medium corresponding to the indoor load to be provided to the indoor unit 3.

The heat medium flow control devices 34 are illustrated as heat medium flow control devices 34a to 34d from above in the drawing in accordance with the indoor units 3. Each of the heat medium flow control devices 34 may be disposed on the inlet side of the heat-medium flow in the use-side heat exchanger 35. The heat medium flow control device 34 may also be disposed on the inlet side of the heat-medium flow in the use-side heat exchanger 35 and between the second heat medium flow switching device 33 and the use-side heat exchanger 35. If no load is required in the indoor unit 3, for example, in the case where the indoor unit 3 is inactive or in a thermostat off state, the supply of the heat medium to the indoor unit 3 can be stopped by fully closing the heat medium flow control device 34.

If the first heat medium flow switching device 32 or second heat medium flow switching device 33 has the function of the heat medium flow control device 34, the heat medium flow control device 34 can be omitted.

The relay unit 2 includes temperature sensors 40 (temperature sensors 40a and 40b) for detecting temperatures of the heat medium on the outlet sides of the intermediate heat exchangers 25. Information (temperature information) detected by the temperature sensors 40 is sent to a controller 50 configured to control actions of the air-conditioning apparatus 100, and it is used in controlling a driving frequency of the compressor 10, a rotation speed of the air-sending device, which is not illustrated, switching of the first refrigerant flow switching device 11, driving frequencies of the pumps 31, switching of the second refrigerant flow switching devices 28, switching of the heat-medium flow, adjustment of the flow rate of the heat medium in the indoor unit 3, and the like. The state where the controller 50 is incorporated in the relay unit 2 is illustrated as an example. Other cases are also applicable. The controller 50 may be incorporated in the outdoor unit 1 or indoor units 3, or incorporated in each unit such that they can communicate with one another.

The controller 50 may include a microcomputer or the like and controls the actuators (pumps 31, first heat medium flow switching devices 32, second heat medium flow switching devices 33, expansion devices 26), for example, controls the driving frequency of the compressor 10, the rotation speed of the air-sending device (including ON/OFF), the switching of the first refrigerant flow switching device 11, the driving of the pumps 31, the opening degrees of the expansion devices 26, the opening degrees of the opening and closing devices, the switching of the second refrigerant flow switching devices 28, the switching of the first heat medium flow switching devices 32, the switching of the second heat medium flow switching devices 33, the driving of the heat medium flow control devices 34, and the like on the basis of information detected by various kinds of detecting means and an instruction from a remote controller.

The pipes 5 allowing the heat medium to travel therethrough includes the pipe connected to the intermediate heat exchanger 25a and the pipe connected to the intermediate heat exchanger 25b. The pipes 5 are split (here, in four) in accordance with the number of indoor units 3 connected to the relay unit 2. The pipes 5 are connected at the first heat medium flow switching devices 32 and the second heat medium flow switching devices 33. Whether the heat medium from the intermediate heat exchanger 25a is to flow into the use-side heat exchanger 35 or the heat medium from the intermediate heat exchanger 25b is to flow into the use-side heat exchanger 35 is determined by controlling the first heat medium flow switching devices 32 and the second heat medium flow switching devices 33.

In the air-conditioning apparatus 100, the compressor 10, first refrigerant flow switching device 11, heat-source-side heat exchanger 12, opening and closing device 27, opening and closing device 29, second refrigerant flow switching devices 28, refrigerant flows in the intermediate heat exchangers 25, expansion devices 26, and accumulator 19 are connected together by the refrigerant pipes 4, and they constitute the refrigerant circuit A. The heat medium flows in the intermediate heat exchangers 25, pumps 31, first heat medium flow switching devices 32, heat medium flow control devices 34, use-side heat exchangers 35, and second heat medium flow switching devices 33 are connected by the pipes 5, and they constitute the heat medium circuit B. That is, the plurality of use-side heat exchangers 35 are connected in parallel to each of the intermediate heat exchangers 25, and the heat medium circuit B has a plurality of blocks.

Accordingly, in the air-conditioning apparatus 100, the outdoor unit 1 and relay unit 2 are connected through the intermediate heat exchangers 25a and 25b included in the relay unit 2. The relay unit 2 and indoor units 3 are connected through the intermediate heat exchangers 25a and 25b. That is, in the air-conditioning apparatus 100, the heat-source-side refrigerant circulating in the refrigerant circuit A and the heat medium circulating in the heat medium circuit B exchange heat with each other in the intermediate heat exchangers 25a and 25b. With this configuration, the air-conditioning apparatus 100 can achieve optimal cooling operation or heating operation corresponding to the indoor load.

[Operation Modes]

The operation modes implemented by the air-conditioning apparatus 100 are described. The air-conditioning apparatus 100 can perform cooling operation or heating operation in each of the indoor units 3 on the basis of an instruction from that indoor unit 3. That is, the air-conditioning apparatus 100 can perform the same operation in all of the indoor units 3 and can also perform different operations in the indoor units 3.

The operation modes implemented by the air-conditioning apparatus 100 include a heating only operation mode in which all of the driving indoor units 3 performs heating operation, a cooling only operation mode in which all of the driving indoor units 3 performs cooling operation, and a cooling and heating mixed operation mode. The cooling and heating mixed operation mode includes a cooling main operation mode in which the cooling load is larger than the heating load and a heating main operation mode in which the heating load is larger than the cooling load. The operation modes are described below using the streams of the heat-source-side refrigerant and the heat medium.

[Heating Only Operation Mode]

Figure 3:
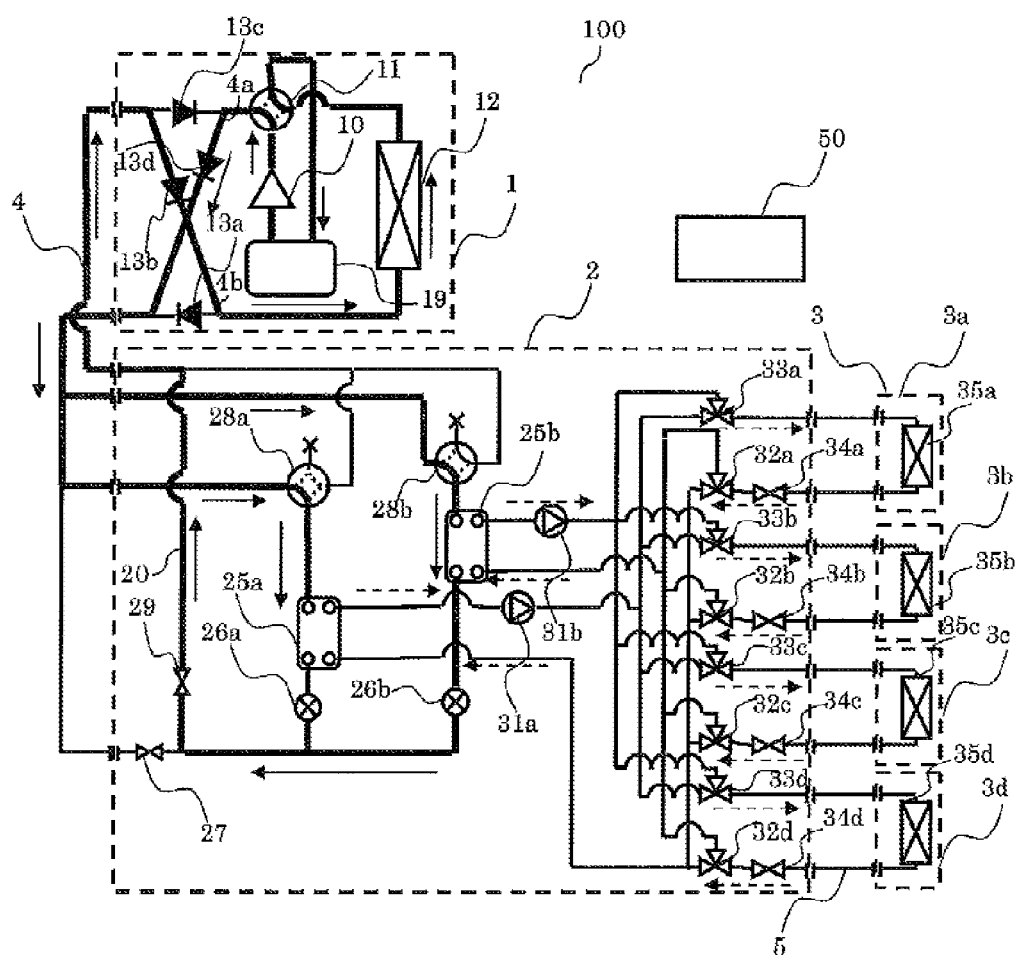
FIG. 3 is a circuit diagram that illustrates streams of a refrigerant and a heat medium in heating only operation mode in the air-conditioning apparatus according to Embodiment of the present invention.

FIG. 3 is a refrigerant circuit diagram that illustrates the stream of the refrigerant in heating only operation mode in the air-conditioning apparatus 100. With reference to FIG. 3, the heating only operation mode is described using the case where the heating energy load is generated in all the use-side heat exchangers 35a to 35d, as an example. In FIG. 3, the pipes indicated by the thick lines are the pipes in which the heat-source-side refrigerant flows. In FIG. 3, the directions in which the heat-source-side refrigerant flows are indicated by the solid line arrows, and the directions in which the heat medium flows are indicated by the broken line arrows.

In the case of the heating only operation mode illustrated in FIG. 3, in the outdoor unit 1, the first refrigerant flow switching device 11 is switched such that the heat-source-side refrigerant discharged from the compressor 10 flows into the relay unit 2 without passing through the heat-source-side heat exchanger 12. In the relay unit 2, the pumps 31a and 31b are driven, the heat medium flow control devices 34a to 34d are opened, and the heat medium is circulated between each of the intermediate heat exchangers 25a and 25b and each of the use-side heat exchangers 35a to 35d.

The second refrigerant flow switching devices 28a and 28b are switched to the heating side, the opening and closing device 27 is closed, and the opening and closing device 29 is opened.

First, the stream of the heat-source-side refrigerant in the refrigerant circuit A is described.

A low-temperature and low-pressure refrigerant is compressed by the compressor 10 into a high-temperature and high-pressure gas refrigerant, and the gas refrigerant is discharged. The high-temperature and high-pressure gas refrigerant discharged from the compressor 10 passes through the first refrigerant flow switching device 11, travels in the refrigerant connection pipe 4a, passes through the check valve 13d, and exits from the outdoor unit 1. The high-temperature and high-pressure gas refrigerant exiting from the outdoor unit 1 runs through the refrigerant pipe 4 and flows into the relay unit 2. The high-temperature and high-pressure gas refrigerant flowing to the relay unit 2 is split, and the gas refrigerants pass through the second refrigerant flow switching devices 28a and 28b and flow into the intermediate heat exchangers 25a and 25b, respectively.

The high-temperature and high-pressure gas refrigerants flowing to the intermediate heat exchangers 25a and 25b condense and liquefy while transferring heat to the heat medium circulating in the heat medium circuit B and become high-pressure liquid refrigerants. The liquid refrigerants exiting from the intermediate heat exchangers 25a and 25b are expanded by the expansion devices 26a and 26b and become low-temperature and low-pressure two-phase refrigerants. The two-phase refrigerants join with each other, and the refrigerant passes through the opening and closing device 29, exits from the relay unit 2, runs through the refrigerant pipe 4, and flows into the outdoor unit 1 again. The refrigerant flowing to the outdoor unit 1 travels in the refrigerant connection pipe 4b, passes through the check valve 13b, and flows into the heat-source-side heat exchanger 12 functioning as an evaporator.

The heat-source-side refrigerant flowing to the heat-source-side heat exchanger 12 receives heat from air in the outdoor space 6 (hereinafter referred to as outside air) in the heat-source-side heat exchanger 12 and becomes a low-temperature and low-pressure gas refrigerant. The low-temperature and low-pressure gas refrigerant existing from the heat-source-side heat exchanger 12 passes through the first refrigerant flow switching device 11 and the accumulator 19 and is sucked into the compressor 10 again.

At that time, the opening degree of the expansion device 26 is controlled such that the subcool (degree of subcooling) obtained as the difference between the value in which the pressure of the heat-source-side refrigerant flowing between the intermediate heat exchanger 25 and the expansion device 26 is converted into a saturated temperature and the temperature on the outlet side of the intermediate heat exchanger 25 is constant. When the temperature at an intermediate location of the intermediate heat exchanger 25 can be measured, the temperature at the intermediate location may be used in place of the saturated temperature obtained by the conversion. In that case, no pressure sensor is needed, and the system can be inexpensive.

Next, the stream of the heat medium in the heat medium circuit B is described.

In heating only operation mode, the heating energy of the heat-source-side refrigerant is transmitted to the heat medium in both the intermediate heat exchangers 25a and 25b, and the warmed heat medium is made to flow inside the pipes 5 by the pumps 31a and 31b. The heat medium is pressurized by each of the pumps 31a and 31b, exits therefrom, and flows into the use-side heat exchangers 35a to 35d through the second heat medium flow switching devices 33a to 33d. The heat medium transfers heat to the indoor air in each of the use-side heat exchangers 35a to 35d, thereby heating the indoor space 7.

The heat media exit from the use-side heat exchangers 35a to 35d and flow into the heat medium flow control devices 34a to 34d. At that time, the heat media flow into the use-side heat exchangers 35a to 35d at flow rates adjusted to those required to produce the air conditioning load required in the insides of the rooms by the workings of the heat medium flow control devices 34a to 34d. The heat media exiting from the heat medium flow control devices 34a to 34d pass through the first heat medium flow switching devices 32a to 32d, flow into the intermediate heat exchangers 25a and 25b, take the amount of heat corresponding to the heat supplied to the indoor space 7 through the indoor units 3 from the refrigerant side, and are sucked into the pumps 31a and 31b again.

In the pipe 5 in the use-side heat exchanger 35, the heat medium flows in the direction from the second heat medium flow switching device 33 through the heat medium flow control device 34 toward the first heat medium flow switching device 32. The air conditioning load required in the indoor space 7 can be produced by controlling in which the difference between the temperature detected by the temperature sensor 40a or the temperature detected by the temperature sensor 40b and the temperature of the heat medium exiting from the use-side heat exchanger 35 is kept at a target value. As the temperature of the outlet of the intermediate heat exchanger 25, either one of the temperature detected by the temperature sensor 40a or that by the temperature sensor 40b may be used or the mean temperature thereof may also be used.

At that time, each of the first heat medium flow switching device 32 and the second heat medium flow switching device 33 is controlled such that its opening degree is an intermediate opening degree or an opening degree corresponding to the temperatures of the heat media on the outlets of the intermediate heat exchangers 25a and 25b in order to provide the flows toward both the intermediate heat exchangers 25a and 25b. Originally, the use-side heat exchanger 35 should be controlled using the difference between the temperature on its inlet and that on its outlet. However, because the temperature of the heat medium on the inlet side of the use-side heat exchanger 35 is substantially the same as the temperature detected by the temperature sensor 40b, the use of the temperature sensor 40b can reduce the number of temperature sensors and can result in an inexpensive system configuration.

To implement the heating only operation mode, because it is not necessary to cause the heat medium to flow into a use-side heat exchanger 35 having no heat load (including a thermostat off state), the flow is closed by the heat medium flow control device 34 to prevent the heat medium from flowing into that use-side heat exchanger 35. In FIG. 3, because each of all the use-side heat exchangers 35a to 35d has a heat load, the heat media flow into them. If the heat load is lost, the corresponding heat medium flow control device 34 may be fully closed. If a heat load is generated again, the corresponding heat medium flow control device 34 may be opened, and the heat medium may be circulated. The same applies to the other operation modes described below.

[Cooling Only Operation Mode]

Figure 4:
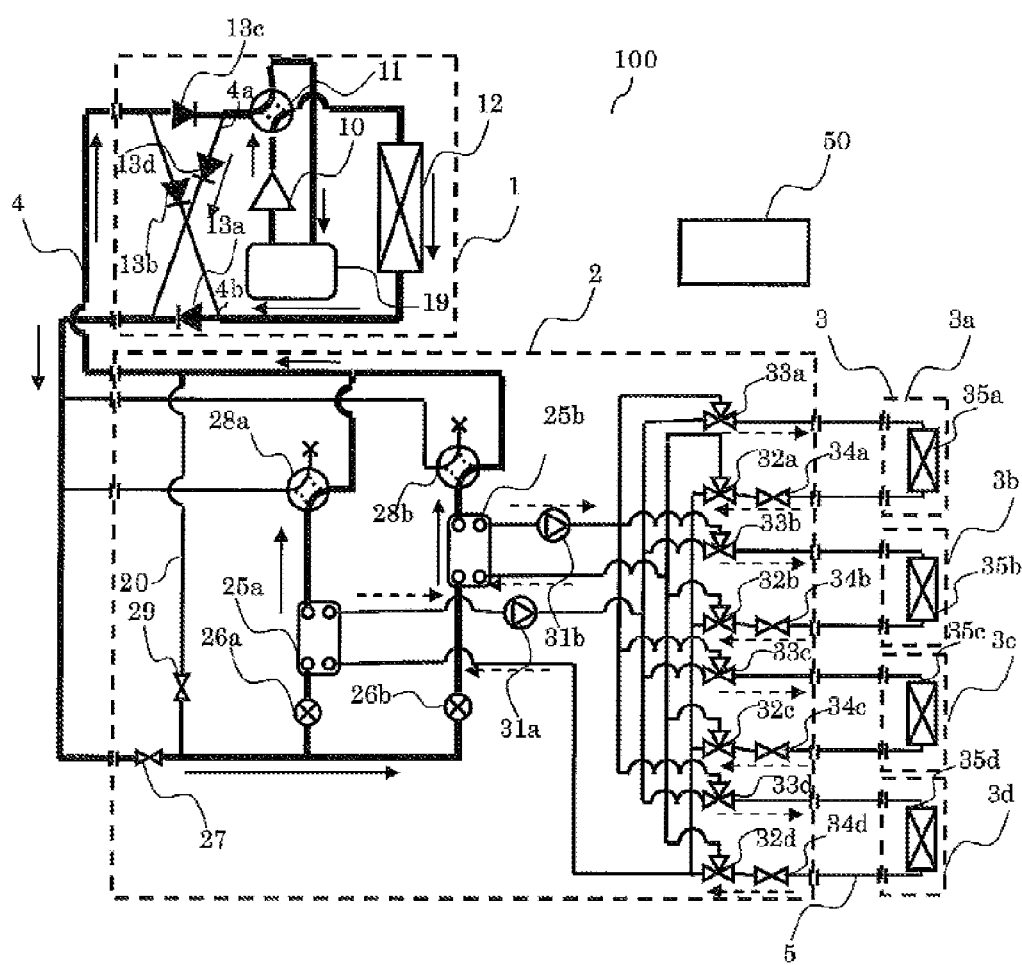
FIG. 4 is a circuit diagram that illustrates the streams of the refrigerant and the heat medium in cooling only operation mode in the air-conditioning apparatus according to Embodiment of the present invention.

FIG. 4 is a refrigerant circuit diagram that illustrates the stream of the refrigerant in cooling only operation mode in the air-conditioning apparatus 100. With reference to FIG. 4, the cooling only operation mode is described using the case where the cooling energy load is generated in all the use-side heat exchangers 35a to 35d, as an example. In FIG. 4, the directions in which the heat-source-side refrigerant flows are indicated by the solid line arrows, and the directions in which the heat medium flows are indicated by the broken line arrows.

In the case of the cooling only operation mode illustrated in FIG. 4, in the outdoor unit 1, the first refrigerant flow switching device 11 is switched such that the heat-source-side refrigerant discharged from the compressor 10 flows into the heat-source-side heat exchanger 12.

In the relay unit 2, the pumps 31a and 31b are driven, the heat medium flow control devices 34a to 34d are opened, and the heat medium is circulated between each of the intermediate heat exchangers 25a and 25b and each of the use-side heat exchangers 35a to 35d. The second refrigerant flow switching devices 28a and 28b are switched to the cooling side, the opening and closing device 27 is opened, and the opening and closing device 29 is closed.

First, the stream of the heat-source-side refrigerant in the refrigerant circuit A is described.

A low-temperature and low-pressure refrigerant is compressed by the compressor 10 into a high-temperature and high-pressure gas refrigerant, and the gas refrigerant is discharged. The high-temperature and high-pressure gas refrigerant discharged from the compressor 10 passes through the first refrigerant flow switching device 11 and then the heat-source-side heat exchanger 12, exchanges heat with the outside air, becomes a high-temperature and high-pressure liquid or two-phase refrigerant, passes through the check valve 13a, travels in the refrigerant connection pipe 4a, and exits from the outdoor unit 1. The high-temperature and high-pressure liquid or two-phase refrigerant exiting from the outdoor unit 1 runs through the refrigerant pipe 4 and flows into the relay unit 2. The high-temperature and high-pressure liquid or two-phase refrigerant flowing to the relay unit 2 passes through the opening and closing device 27 and is then split, and the refrigerants are expanded by the expansion devices 26a and 26b and become low-temperature and low-pressure two-phase refrigerants. The low-temperature and low-pressure two-phase refrigerants evaporate and gasify while receiving heat from the heat medium circulating in the heat medium circuit B and become low-temperature gas refrigerants. The gas refrigerants exiting from the intermediate heat exchangers 25a and 25b pass through the second refrigerant flow switching devices 28a and 28b, exit from the relay unit 2, travel in the refrigerant connection pipe 4b, pass through the check valve 13c, pass through the first refrigerant flow switching device 11 and the accumulator 19, and are sucked into the compressor 10 again.

At that time, the opening degree of the expansion device 26 is controlled such that the superheat (degree of superheat) obtained as the difference between the value in which the pressure of the heat-source-side refrigerant flowing between the intermediate heat exchanger 25 and the expansion device 26 is converted into a saturated temperature and the temperature on the outlet side of the intermediate heat exchanger 25 is constant. When the temperature at an intermediate location of the intermediate heat exchanger 25 can be measured, the temperature at the intermediate location may be used in place of the saturated temperature obtained by the conversion. In that case, no pressure sensor is needed, and the system can be inexpensive.

Next, the stream of the heat medium in the heat medium circuit B is described.

In cooling only operation mode, the heating energy of the heat medium is transmitted to the heat-source-side refrigerant in both the intermediate heat exchangers 25a and 25b, and the cooled heat medium is pressurized by each of the pumps 31a and 31b, exits therefrom, and flows into the use-side heat exchangers 35a to 35d through the second heat medium flow switching devices 33a to 33d. The heat medium receives heat from the indoor air in each of the use-side heat exchangers 35a to 35d, thereby cooling the indoor space 7.

The heat media exit from the use-side heat exchangers 35a to 35d and flow into the heat medium flow control devices 34a to 34d. At that time, the heat media flow into the use-side heat exchangers 35a to 35d at flow rates adjusted to those required to produce the air conditioning load required in the insides of the rooms by the workings of the heat medium flow control devices 34a to 34d. The heat media exiting from the heat medium flow control devices 34a to 34d pass through the first heat medium flow switching devices 32a to 32d, flow into the intermediate heat exchangers 25a and 25b, provide the refrigerant side with the amount of heat corresponding to the heat received from the indoor space 7 through the indoor units 3, and are sucked into the pumps 31a and 31b again.

In the pipe 5 in the use-side heat exchanger 35, the heat medium flows in the direction from the second heat medium flow switching device 33 through the heat medium flow control device 34 toward the first heat medium flow switching device 32. The air conditioning load required in the indoor space 7 can be produced by controlling in which the difference between the temperature detected by the temperature sensor 40a or the temperature detected by the temperature sensor 40b and the temperature of the heat medium exiting from the use-side heat exchanger 35 is kept at a target value. As the temperature of the outlet of the intermediate heat exchanger 25, either one of the temperature detected by the temperature sensor 40a or that by the temperature sensor 40b may be used or the mean temperature thereof may also be used.

At that time, each of the first heat medium flow switching device 32 and the second heat medium flow switching device 33 is controlled to such that its opening degree is an intermediate opening degree or an opening degree corresponding to the temperatures of the heat media on the outlets of the intermediate heat exchangers 25a and 25b in order to provide the flows toward both the intermediate heat exchangers 25a and 25b. Originally, the use-side heat exchanger 35 should be controlled using the difference between the temperature on its inlet and that on its outlet. However, because the temperature of the heat medium on the inlet side of the use-side heat exchanger 35 is substantially the same as the temperature detected by the temperature sensor 40b, the use of the temperature sensor 40b can reduce the number of temperature sensors and can result in an inexpensive system configuration.

[Mixed Operation Mode]

Figure 5:
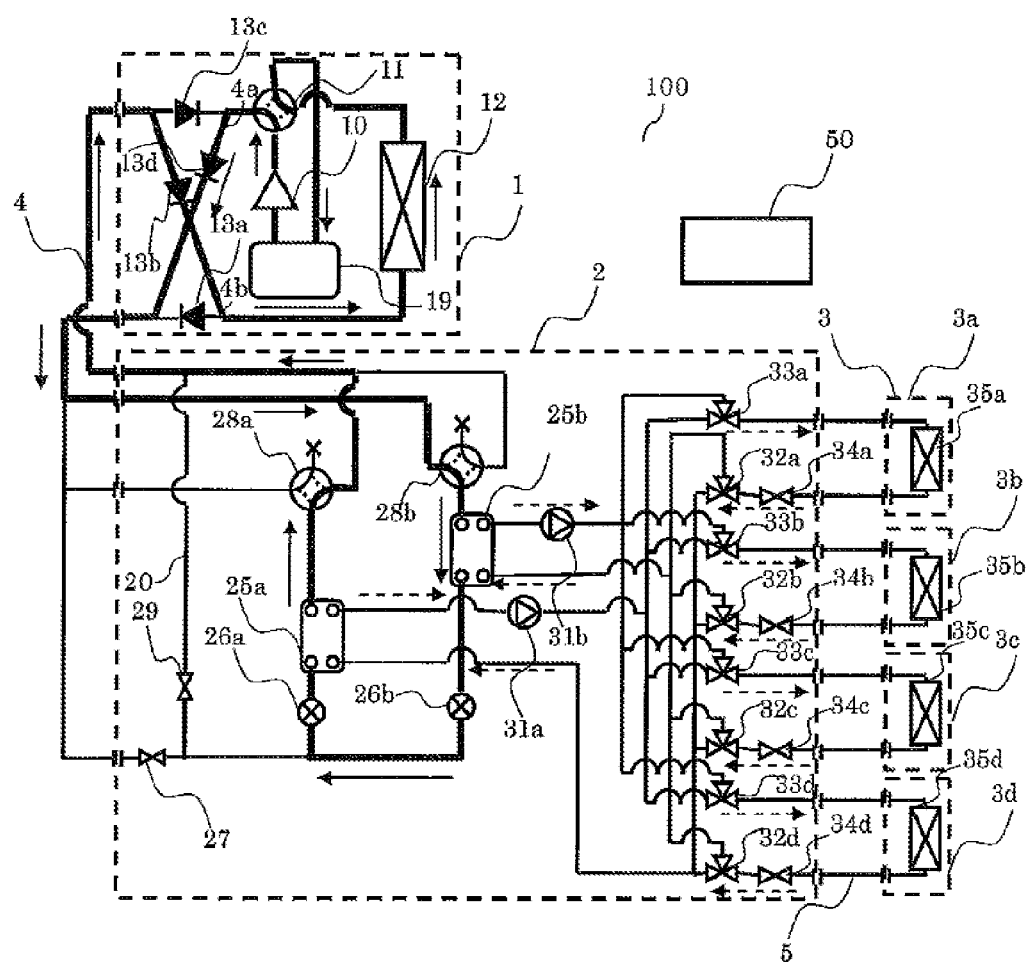
FIG. 5 is a circuit diagram that illustrates the streams of the refrigerant and the heat medium in mixed mode of cooling operation and heating operation in the air-conditioning apparatus according to Embodiment of the present invention.

FIG. 5 is a refrigerant circuit diagram that illustrates the stream of the refrigerant in mixed operation mode in the air-conditioning apparatus 100. With reference to FIG. 5, heating main operation mode is described. The heating main operation mode is included in the mixed operation, which is the case where a heating energy load is generated in one or more of the use-side heat exchangers 35 and a cooling energy load is generated in the remaining of the use-side heat exchangers 35. In FIG. 5, the pipes indicated by the thick lines are the pipes in which the heat-source-side refrigerant circulates. In FIG. 5, the directions in which the heat-source-side refrigerant flows are indicated by the solid line arrows, and the directions in which the heat medium flows are indicated by the broken line arrows.

In the case of the heating main operation mode illustrated in FIG. 5, in the outdoor unit 1, the first refrigerant flow switching device 11 is switched such that the heat-source-side refrigerant discharged from the compressor 10 flows into the relay unit 2 without passing through the heat-source-side heat exchanger 12. In the relay unit 2, the pumps 31a and 31b are driven, the heat medium flow control devices 34a to 34d are opened, and the heat medium is circulated between the intermediate heat exchanger 25a and a use-side heat exchanger 35 in which a cooling energy load is generated and is circulated between the intermediate heat exchanger 25b and a use-side heat exchanger 35 in which a heating energy load is generated. The second refrigerant flow switching device 28a is switched to the cooling side, and the second refrigerant flow switching device 28b is switched to the heating side. The expansion device 26a is fully opened, the opening and closing device 27 is closed, and the opening and closing device 29 is closed.

First, the stream of the heat-source-side refrigerant in the refrigerant circuit A is described.

A low-temperature and low-pressure refrigerant is compressed by the compressor 10 into a high-temperature and high-pressure gas refrigerant, and the gas refrigerant is discharged. The high-temperature and high-pressure gas refrigerant discharged from the compressor 10 passes through the first refrigerant flow switching device 11, travels in the refrigerant connection pipe 4a, passes through the check valve 13d, and exits from the outdoor unit 1. The high-temperature and high-pressure gas refrigerant exiting from the outdoor unit 1 runs through the refrigerant pipe 4 and flows into the relay unit 2. The high-temperature and high-pressure gas refrigerant flowing to the relay unit 2 passes through the second refrigerant flow switching device 28b and flows into the intermediate heat exchanger 25b serving as a condenser.

The gas refrigerant flowing to the intermediate heat exchanger 25b condenses and liquefies while transferring heat to the heat medium circulating in the heat medium circuit B and becomes a liquid refrigerant. The liquid refrigerant exiting from the intermediate heat exchanger 25b is expanded by the expansion device 26b and becomes a low-pressure two-phase refrigerant. The low-pressure two-phase refrigerant passes through the expansion device 26a and flows into the intermediate heat exchanger 25a serving as an evaporator. The low-pressure two-phase refrigerant flowing to the intermediate heat exchanger 25a is evaporated by receiving heat from the heat medium circulating in the heat medium circuit B and cools the heat medium. The low-pressure two-phase refrigerant exits from the intermediate heat exchanger 25a, passes through the second refrigerant flow switching device 28a, exits from the relay unit 2, runs through the refrigerant pipe 4, and flows into the outdoor unit 1 again.

The low-temperature and low-pressure two-phase refrigerant flowing to the outdoor unit 1 passes through the check valve 13b and flows into the heat-source-side heat exchanger 12 serving as an evaporator. The refrigerant flowing to the heat-source-side heat exchanger 12 receives heat from the outside air in the heat-source-side heat exchanger 12 and becomes a low-temperature and low-pressure gas refrigerant. The low-temperature and low-pressure gas refrigerant exiting from the heat-source-side heat exchanger 12 passes through the first refrigerant flow switching device 11 and the accumulator 19 and is sucked into the compressor 10 again.

The opening degree of the expansion device 26b is controlled such that the subcool (degree of subcooling) of the refrigerant on the outlet of the intermediate heat exchanger 25b is a target value. The expansion device 26b may be fully opened, and the subcool may be controlled by the expansion device 26a.

Next, the stream of the heat medium in the heat medium circuit B is described.

In first heating main operation mode, the heating energy of the heat-source-side refrigerant is transmitted to the heat medium in the intermediate heat exchanger 25b, and the warmed heat medium is made to flow inside the pipes 5 by the pump 31b. In first heating main operation mode, the cooling energy of the heat-source-side refrigerant is transmitted to the heat medium in the intermediate heat exchanger 25a, and the cooled heat medium is made to flow inside the pipes 5 by the pump 31a. The cooled heat medium is pressurized by the pump 31a, exits therefrom, and flows into the use-side heat exchanger 35 in which the cooling energy load is generated through the second heat medium flow switching device 33. The heat medium is pressurized by the pump 31b, exits therefrom, and flows into the use-side heat exchanger 35 in which the heating energy load is generated through the second heat medium flow switching device 33.

At that time, when the indoor unit 3 is in heating operation mode, the second heat medium flow switching device 33 connected to that indoor unit 3 is switched to the direction in which it is connected to the intermediate heat exchanger 25b and the pump 31b. When the indoor unit 3 is in cooling operation mode, the second heat medium flow switching device 33 connected to that indoor unit 3 is switched to the direction in which it is connected to the intermediate heat exchanger 25a and the pump 31a. That is, the second heat medium flow switching device 33 can enable switching the heat medium to be supplied to the indoor unit 3 between that for heating and that for cooling.

The use-side heat exchanger 35 performs the cooling operation on the indoor space 7 using the heat medium receiving heat from the indoor air or performs the heating operation on the indoor space 7 using the heat medium transferring heat to the indoor air. At that time, the heat medium flows into the use-side heat exchanger 35 at a flow rate adjusted to that required to produce the air conditioning load required in the inside of the room by the workings of the heat medium flow control device 34.

The heat medium used in the cooling operation, passing through the use-side heat exchanger 35, and slightly increasing its temperature passes through the heat medium flow control device 34 and the first heat medium flow switching device 32, flows into the intermediate heat exchanger 25a, and is sucked into the pump 31a again. The heat medium used in the heating operation, passing through the use-side heat exchanger 35, and slightly decreasing its temperature passes through the heat medium flow control device 34 and the first heat medium flow switching device 32, flows into the intermediate heat exchanger 25b, and is sucked into the pump 31b again. At that time, when the indoor unit 3 is in heating operation mode, the first heat medium flow switching device 32 connected to that indoor unit 3 is switched to the direction in which it is connected to the intermediate heat exchanger 25b and the pump 31b. When the indoor unit 3 is in cooling operation mode, the first heat medium flow switching device 32 connected to that indoor unit 3 is switched to the direction in which it is connected to the intermediate heat exchanger 25a and the pump 31a.

During this state, the workings of the first heat medium flow switching device 32 and the second heat medium flow switching device 33 enable the warm heat medium and cold heat medium to be guided to a use-side heat exchanger 35 in which the heating energy load is generated and another use-side heat exchanger 35 in which the cooling energy load is generated, respectively, without mixing with each other. In this manner, the heat medium used in the heating operation mode flows into the intermediate heat exchanger 25b, where the refrigerant provides heat as a heating purpose, the heat medium used in the cooling operation mode flows into the intermediate heat exchanger 25a, where the refrigerant receives heat as a cooling purpose, and the heat media exchange heat with the respective refrigerants again and are conveyed to the pumps 31a and 31b, respectively.

In the pipe 5 in the use-side heat exchanger 35, the heat medium flows in the direction from the second heat medium flow switching device 33 through the heat medium flow control device 34 toward the first heat medium flow switching device 32 on both the heating side and cooling side. The air conditioning load required in the indoor space 7 can be produced by controlling in which the difference between the temperature detected by the temperature sensor 40b and the temperature of the heat medium exiting from the use-side heat exchanger 35 on the heating side and the difference between the temperature detected by the temperature sensor 40a and the temperature of the heat medium exiting from the use-side heat exchanger 35 on the cooling side are kept at target values.

[Pipe 5 (Heat-Medium Conveying Pipe 5)]

To enable each of the indoor unit 3 to exchange heat with the indoor space 7 with a proper capacity, the flow rate of the heat medium flowing in the pipe 5 is controlled by the pumps 31 and the heat medium flow control devices 34. If the inside diameter of the pipe 5 is too small, the flow speed of the heat medium flowing in the pipe 5 is excessively high. If the heat medium continuously flows in the pipe 5 at a flow speed exceeding 2 m/s, for example, the oxide film formed in the pipe 5 may be separated, and this may cause pitting corrosion in the pipe. If the inside diameter of the pipe 5 is too large, the flow speed of the heat medium flowing in the pipe 5 is excessively low. If the heat medium continuously flows in the pipe 5 at a flow speed below 0.5 m/s, corrosive products existing in the heat medium circuit B may accumulate in the pipe 5, and this may cause pitting corrosion in the pipe.

Thus, the inside diameter of the pipe 5 in the air-conditioning apparatus 100 is set such that the heat medium flows in the pipe 5 at a flow speed at which the oxide film is not separated and corrosive products do not accumulate, that is, at a flow speed of 0.5 m/s to 2 m/s. Because the flow speed of the heat medium flowing in the pipe 5 depends on the capacity of the use-side heat exchanger 35 connected to the pipe 5, the inside diameter of the pipe 5 is set in accordance with the capacity of the use-side heat exchanger 35. An optimum selection range of inside diameters of the pipe 5 for cooling operation is different from that for heating operation. The inside diameter of the pipe 5 is set in accordance with the optimum selection range for cooling operation and that for heating operation.

Figure 6:
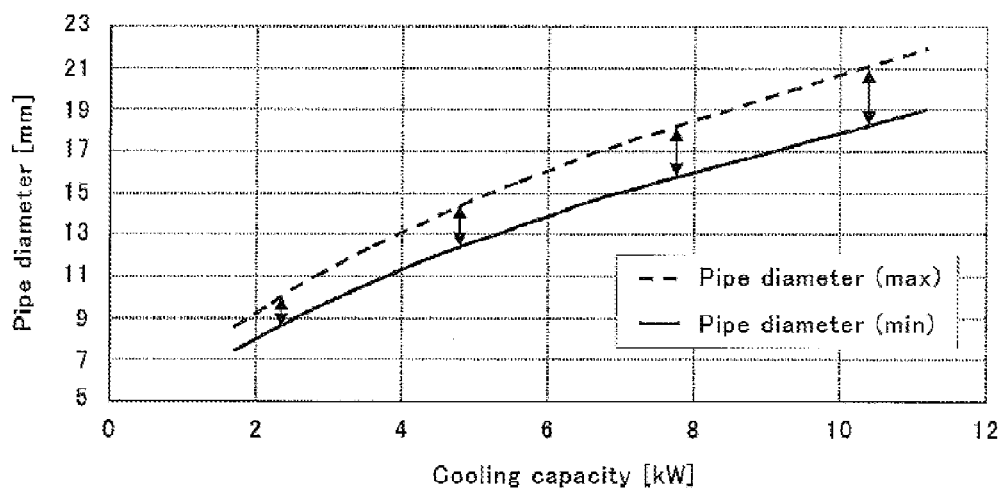
FIG. 6 illustrates a relationship between the capacity of a use-side heat exchanger and an optimum selection range of inside diameters of a pipe connected thereto in cooling operation in the air-conditioning apparatus according to Embodiment of the present invention.

FIG. 6 illustrates a relationship between the capacity of the use-side heat exchanger and the optimum selection range of inside diameters of the pipe connected thereto in cooling operation in the air-conditioning apparatus 100. The horizontal axis indicates the capacity of the use-side heat exchanger 35 in cooling operation (cooling operation capacity), and the vertical axis indicates the inside diameter of the pipe 5 connected to that use-side heat exchanger 35. In FIG. 6, the solid line indicates the lower limit of the selection range of inside diameters of the pipe 5, that is, the inside diameter above which the oxide film is not separated, and the broken line indicates the upper limit of the selection range of inside diameters of the pipe 5, that is, the inside diameter below which corrosive products do not accumulate. As illustrated in FIG. 6, the optimum selection range of inside diameters of the pipe 5 varies with the capacity of the use-side heat exchanger 35.

Figure 7:
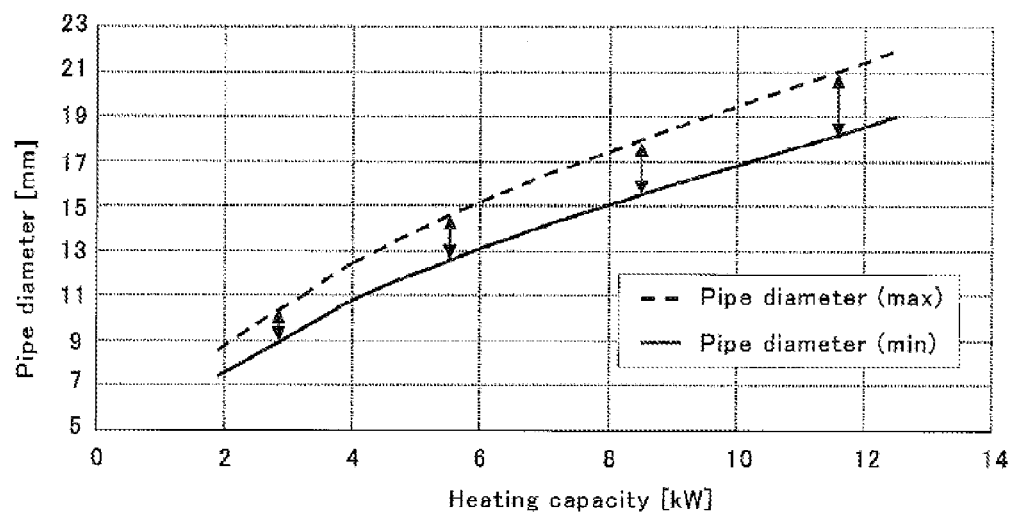
FIG. 7 illustrates a relationship between the capacity of the use-side heat exchanger and an optimum selection range of inside diameters of the pipe connected thereto in heating operation in the air-conditioning apparatus according to Embodiment of the present invention.

FIG. 7 illustrates a relationship between the capacity of the use-side heat exchanger and the optimum selection range of inside diameters of the pipe connected thereto in heating operation in the air-conditioning apparatus 100. The horizontal axis indicates the capacity of the use-side heat exchanger 35 in heating operation (heating operation capacity), and the vertical axis indicates the inside diameter of the pipe 5 connected to that use-side heat exchanger 35. In FIG. 7, the solid line indicates the lower limit of the selection range of inside diameters of the pipe 5, that is, the inside diameter above which the oxide film is not separated, and the broken line indicates the upper limit of the selection range of inside diameters of the pipe 5, that is, the inside diameter below which corrosive products do not accumulate. As illustrated in FIG. 7, the optimum selection range of inside diameters of the pipe 5 varies with the capacity of the use-side heat exchanger 35.

As illustrated in FIGS. 6 and 7, the optimum selection range of inside diameters of the pipe 5 for cooling operation and that for heating operation are different. Therefore, the inside diameter of the pipe 5 is set to a value within both the optimum selection range when the connected use-side heat exchanger 35 is in cooling operation and the optimum selection range when the connected use-side heat exchanger 35 is in heating operation.

[Variation]

Each of the first heat medium flow switching device 32 and the second heat medium flow switching device 33 described in Embodiment may be any device capable of switching the flow, for example, a device capable of switching a three-way passage, such as a three-way valve, or a combination of two devices each opening and closing a two-way passage, such as opening and closing valves. A device capable of changing a flow rate of a three-way passage, such as a stepping-motor-driven mixing valve, or a combination of two devices each capable of changing a flow rate of a two-way passage, such as electronic expansion valves, may be used as each of the first heat medium flow switching device 32 and the second heat medium flow switching device 33. In that case, water hammer caused by abruptly opening and closing the passage can be prevented. Additionally, in Embodiment, the case where the heat medium flow control device 34 is a two-way valve is described as an example. The heat medium flow control device 34 may be a control valve having a three-way passage and may be disposed with a bypass pipe that bypasses the use-side heat exchanger 35.

The heat medium flow control device 34 may be a stepping-motor-driven device capable of controlling a flow rate of a medium flowing the passage and may also be a two-way valve or a three-way valve in which one port is closed. As the heat medium flow control device 34, a device configured to open and close a two-way passage, such as an opening and closing valve, may be used, and a mean flow rate may be controlled by repeating on and off operations.

The case where the second refrigerant flow switching device 28 is a four-way valve is illustrated as an example. Other cases are also applicable. A plurality of two-way passage switching valves or three-way passage switching valves may also be used, and the refrigerant may be allowed therethrough in substantially the same manner.

The above description can also apply to the case where only one set of the use-side heat exchanger 35 and heat medium flow control device 34 is connected. No problem arises when a plurality of devices working in the same way are disposed as each of the intermediate heat exchanger 25 and expansion device 26. Additionally, although the case where the heat medium flow control device 34 is incorporated in the relay unit 2 is described as an example, other cases are also applicable. The heat medium flow control device 34 may be incorporated in the indoor unit 3 or may also be separated from the relay unit 2 and the indoor unit 3.

Examples of the heat medium may include brine (antifreeze), water, a liquid mixture of brine and water, and a liquid mixture of water and an additive having high anticorrosive properties. Accordingly, in the air-conditioning apparatus 100, even if the heat medium leaks to the indoor space 7 through the indoor unit 3, the use of a material with a high level of safety as the heat medium can contribute to improvement in safety.

In Embodiment, the case where the air-conditioning apparatus 100 includes the accumulator 19 is described as an example. The accumulator 19 is optional. Typically, each of the heat-source-side heat exchanger 12 and the use-side heat exchanger 35 is equipped with the air-sending device, and condensation or evaporation is facilitated by air-sending in many cases. However, other cases are also applicable. For example, a device like a panel heater making use of radiation may also be used as the use-side heat exchanger 35, and a water-cooled type device in which heat is moved by water or antifreeze may also be used as the heat-source-side heat exchanger 12. That is, any type of the device having a structure that can radiate heat or receive heat may be used as the heat-source-side heat exchanger 12 and the use-side heat exchanger 35.

In Embodiment, the case where the four use-side heat exchangers 35 are used is described as an example. That number is not particularly limited. The case where the two intermediate heat exchangers 25a and 25b are used is described as an example. Other cases are also applicable. Any number of intermediate heat exchangers may be disposed as long as they are configured to be able to cool or/and heat the heat medium. The number of pumps 31a and the number of pumps 31b are not limited to one. As each of the pumps 31a and 31b, a plurality of pumps with small capacities connected in parallel may be used.

As described above, the inside diameter of the pipe 5 in the air-conditioning apparatus 100 according to the present invention is set on the basis of the capacity of the use-side heat exchanger 35 connected to that pipe 5. Thus, the heat medium flows in the pipe 5 at an appropriate flow speed. Therefore, the occurrence of corrosion in the pipe 5 can be reduced, leakage of the heat medium from the pipe 5 can be suppressed, and safety can be ensured.

REFERENCE SIGNS LIST 1 outdoor unit
2 relay unit
3 indoor unit
3a indoor unit
3b indoor unit
3c indoor unit
3d indoor unit
4 refrigerant pipe
4a refrigerant connection pipe
4b refrigerant connection pipe
5 pipe (heat-medium conveying pipe)
6 outdoor space
7 indoor space
8 space
9 structure
10 compressor
11 first refrigerant flow switching device
12 heat-source-side heat exchanger
13a check valve
13b check valve
13c check valve
13d *check valve*
19 accumulator
20 bypass pipe
25 intermediate heat exchanger
25a intermediate heat exchanger
25b intermediate heat exchanger
26 expansion device
26a expansion device
26b *expansion device*
27 opening and closing device
28 second refrigerant flow switching device
28a second refrigerant flow switching device
28b second refrigerant flow switching device
29 opening and closing device
31 pump
31a pump
31b pump
32 first heat medium flow switching device
32a first heat medium flow switching device
32b *first heat medium flow switching device*
32c first heat medium flow switching device
32d first heat medium flow switching device
33 second heat medium flow switching device
33a second heat medium flow switching device
33b second heat medium flow switching device
33d *second heat medium flow switching device*
33d second heat medium flow switching device
34 heat medium flow control device
34a heat medium flow control device
34b heat medium flow control device
34c heat medium flow control device
34d heat medium flow control device
35 use-side heat exchanger
35a use-side heat exchanger
35b use-side heat exchanger
35c use-side heat exchanger
35d use-side heat exchanger
40 temperature sensor
40a temperature sensor
40b temperature sensor
50 controller
100 air-conditioning apparatus A refrigerant circuit B heat medium circuit.

The invention claimed is:

1. An air-conditioning apparatus comprising:
a refrigerant circuit in which a compressor, a heat-source-side heat exchanger, an expansion device, and a refrigerant flow path in at least one intermediate heat exchanger configured to cause heat exchange between a refrigerant and a heat medium are connected by a refrigerant pipe, the refrigerant circuit being configured to cause the refrigerant to circulate therethrough; and a heat medium circuit in which a pump, a use-side heat exchanger, and a heat-medium flow path in the at least one intermediate heat exchanger are connected by a heat-medium conveying pipe, the heat medium circuit being configured to cause the heat medium to circulate therethrough, wherein the at least one intermediate heat exchanger comprises a plurality of intermediate heat exchangers, the plurality of intermediate heat exchangers are operative in a heating only operation mode in which all of the intermediate heat exchangers serve as condensers, a cooling only operation mode in which all of the intermediate heat exchangers serve as evaporators, and a cooling and heating mixed operation mode in which some of the intermediate heat exchangers serve as condensers and others of the intermediate heat exchangers serve as evaporators, and the heat-medium conveying pipe has an inside diameter set to a value within both a first range of inside diameters and a second range of inside diameters on the basis of a capacity of the use-side heat exchanger connected to the heat-medium conveying pipe, the second range of inside diameters is different from the first range of inside diameters, the first range of inside diameters is a range of inside diameters being proper when the use-side heat exchanger connected to the heat-medium conveying pipe is in cooling operation, the second range of inside diameters is a range of inside diameters being proper when the use-side heat exchanger connected to the heat-medium conveying pipe is in heating operation.

2. The air-conditioning apparatus of claim 1, wherein each of the ranges of inside diameters being proper has a lower limit above which a flow speed of the heat medium flowing in the heat-medium conveying pipe is a flow speed at which an oxide film is not separated, and each of the ranges of inside diameters being proper has an upper limit below which the flow speed of the heat medium flowing in the heat-medium conveying pipe is a flow speed at which corrosive products do not accumulate.

3. The air-conditioning apparatus of claim 1, wherein the refrigerant comprises a single component refrigerant, a near-azeotropic refrigerant mixture, a zeotropic refrigerant mixture, a natural refrigerant, or a refrigerant that becomes a supercritical state.

4. The air-conditioning apparatus of claim 1, wherein the heat medium comprises antifreeze, water, a liquid mixture of the antifreeze and the water, or a liquid mixture of the water and an anti-corrosion additive.

5. A method of designing an air-conditioning apparatus, the air-conditioning apparatus including a refrigerant circuit in which a compressor, a heat-source-side heat exchanger, an expansion device, and a refrigerant flow path in at least one intermediate heat exchanger configured to cause heat exchange between a refrigerant and a heat medium are connected by a refrigerant pipe, the refrigerant circuit being configured to cause the refrigerant to circulate therethrough, and a heat medium circuit in which a pump, a use-side heat exchanger, and a heat-medium flow path in the at least one intermediate heat exchanger are connected by a heat-medium conveying pipe, the heat medium circuit being configured to cause the heat medium to circulate therethrough, wherein the at least one intermediate heat exchanger comprises a plurality of intermediate heat exchangers, the plurality of intermediate heat exchangers are operative in a heating only operation mode in which all of the intermediate heat exchangers serve as condensers, a cooling only operation mode in which all of the intermediate heat exchangers serve as evaporators, and a cooling and heating mixed operation mode in which some of the intermediate heat exchangers serve as condensers and others of the intermediate heat exchangers serve as evaporators, the method comprises the steps of:

acquiring a capacity of the use-side heat exchanger; and setting an inside diameter of the heat-medium conveying pipe connected to the use-side heat exchanger to a value within both a range of inside diameters being proper when the use-side heat exchanger connected to the heat-medium conveying pipe is in cooling operation and a range of inside diameters being proper when the use-side heat exchanger connected to the heat-medium conveying pipe is in heating operation on a basis of the capacity of the use-side heat exchanger, wherein the range of inside diameters being proper when the use-side heat exchanger connected to the heat-medium conveying pipe is in heating operation is different from the range of inside diameters being proper when the use-side heat exchanger connected to the heat-medium conveying pipe is in cooling operation.

* * * * *